March 22, 1955 — A. SYKES — 2,704,492
MACHINE FOR HOBBING THE TEETH OF GEAR WHEELS
Filed Jan. 4, 1951

Inventor:
Arthur Sykes
by: Michael S. Striker, agt.

United States Patent Office 2,704,492
Patented Mar. 22, 1955

2,704,492

MACHINE FOR HOBBING THE TEETH OF GEAR WHEELS

Arthur Sykes, Huddersfield, England, assignor to David Brown & Sons (Huddersfield), Limited, Huddersfield, England Application January 4, 1951, Serial No. 204,295

Claims priority, application Great Britain January 5, 1950

3 Claims. (Cl. 90—4)

The invention relates to machines for hobbing the teeth of gear wheels, and it has for its principal object to provide a simple and robust machine for the purpose which will be particularly well adapted for performing repetition work, but which can, however, be easily and quickly adjusted if and when a change in the size or characteristics of the gears to be produced is called for.

A further object is so to construct the machine that the load of the hob carriage and the end thrust on the work spindle are adapted to react on each other through the machine frame so as to give the maximum rigidity.

Figure 1:
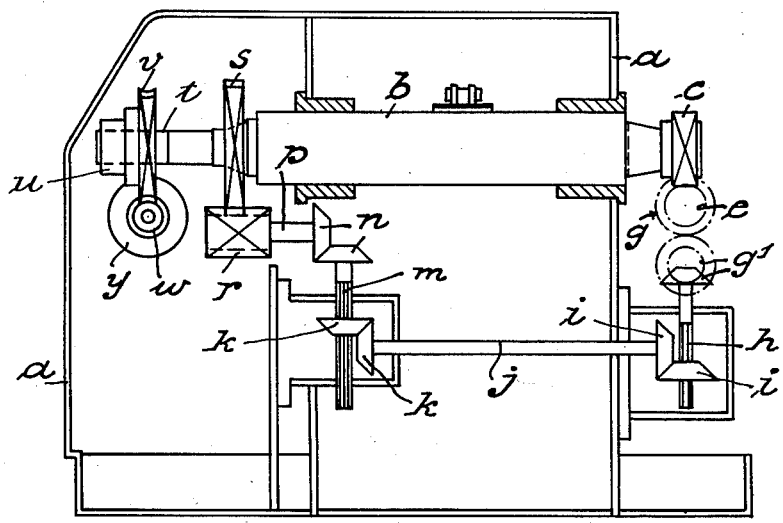
Figure 2:
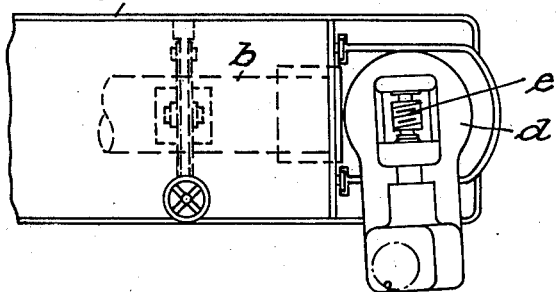
Figure 3:
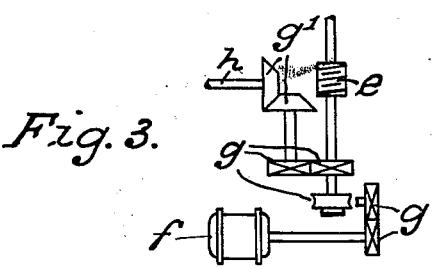

A gear hobbing machine according to the invention is shown more-or-less diagrammatically in the accompanying drawing, in which Fig. 1 is a side elevation of the machine;

Fig. 2 a plan view of the hob supporting carriage at one side of the machine; and Fig. 3 a plan view of the means for driving the hob and for transmitting motion to mechanism at the opposite side of the machine.

Referring to the drawing, a suitable frame work $a$ has mounted in its upper part to be rotatable and horizontally slidable a work spindle $b$ of relatively large diameter, that is to say by way of example, in a machine designed to hob the teeth of gears ranging say from 4 to 5 inches up to 10 inches in diameter, the diameter of the work spindle may be in the region of 10 inches. The work spindle may be tubular in form to reduce its weight.

The work piece $c$ is mounted on the spindle $b$ closely adjacent to one side of the machine frame so as to reduce overhanging to a minimum, and vertically adjustable on this side of the frame there is provided a carriage $d$, see Fig. 2, on which is mounted the hob $e$ a driving motor $f$ and gearing $g$, $g$, and $g'$, $g'$ adapted to convey drive to a vertical shaft $h$ from which, by bevel or equivalent gearing $i$, connection is made to a shaft $j$ extending horizontally across the lower part of the machine.

At the opposite side of the machine the horizontal shaft $j$ is connected by bevel or equivalent gearing $k$ to a vertical shaft $m$ from which connection is made by bevel or equivalent gears $n$ to a short horizontal shaft $p$ journalled in a bracket or part not shown which is adjustable vertically on suitable guides on the machine frame $a$.

On the short horizontal shaft $p$ there is secured an elongated pinion $r$ adapted to mesh with a toothed gear $s$ which may be termed a master wheel fast on the end of the work spindle $b$ opposite to that carrying the work piece $c$.

Also fast on the outer end of the work spindle $b$ adjacent the master wheel $s$ and axially aligned with the spindle is a feed screw $t$ of appropriate pitch which is adapted to work through an axially fixed nut $u$ carried by the machine frame $a$. A worm wheel $v$ fast with the nut $u$ is adapted to be driven by a worm $w$ rotatable by a suitable electric motor $y$, the control for which is appropriately correlated to that of the driving motor $f$ so that both motors cannot be in operation at the same time.

When the driving motor $f$ is in operation it drives the hob $e$ and also through the intermediate connections the elongated pinion $r$ which meshes with the master wheel $s$.

By appropriate determination of the diameter of the master wheel the work piece $c$ is rotated at the required speed and, according to the selected pitch of the feed screw $t$, is fed forward at a determined rate simultaneously with its rotation. When the cutting of the teeth in the work piece is completed the driving motor $f$ is, by appropriate means, automatically stopped and the return motor $y$, as it may be termed, is put into action to cause the axially-fixed nut $u$ to be rotated in a direction to cause the feed screw $t$ to travel backwardly through it and thus to return the work piece $c$ to its initial position for removal and substitution of a new one.

If, as is preferred, the nut $u$ through which the feed screw $t$ works is to be axially-fixed as above mentioned whilst cutting is proceeding, a separate feed screw will be required for each rate of feed, the pitch of the screw being equal to the axial feed per revolution of the work. By the introduction of suitable change gearing the nut $u$ could be rotated, during cutting, in the appropriate direction to cause the screw to be traversed forwardly through the nut. By such means, one feed screw of suitable pitch could be made to serve for all rates of feed for which the machine is designed. In view, however, of the complications involved in the introduction of change gearing, it is preferred to change the feed screw when a change in the rate of feed is desired.

Having thus described my invention, what I claim as new and desire to secure by Letters Patent is:

1. In a machine for hobbing gear teeth, in combination, a frame; a unitary spindle mounted on said frame for axial sliding movement and rotation about its axis; means carried by said spindle adjacent one end thereof for securing a work piece only to said unitary spindle for axial and rotational movement therewith; a driving motor mounted on said frame; gear means, connecting said driving motor to said spindle for rotating the same about the axis thereof, including a master gear axially fixed to said spindle thereof; a feed screw fixed to said spindle for rotation therewith and forming an axial extension thereof; a nut engaging said feed screw; and a return motor operatively connected to said nut for turning the same, whereby, when said drive motor is operating, motion will be transmitted through said gear means to said spindle and the spindle will be axially fed by the reaction of its rotation against said nut, and whereby the return motor, when operating, can impart longitudinal motion to said spindle independent of said drive motor.

2. In a machine for hobbing gear teeth, in combination, a frame; a unitary spindle mounted on said frame for axial sliding movement and rotation about its axis; a driving motor mounted on said frame; a gear means, connecting said driving motor to said spindle for rotating the same about the axis thereof, including a master gear axially fixed to said spindle and an elongated pinion operatively connected to said motor and engaging said master gear and transmitting rotational motion thereto while permitting axial displacement of the master gear with respect to the pinion; a feed screw fixed to said spindle for rotation therewith and forming an axial extension thereof; a nut engaging said feed screw; and a return motor operatively connected to said nut for turning the same, whereby, when said drive motor is operating, motion will be transmitted through said gear means to said spindle and the spindle will be axially fed by the reaction of its rotation against said nut, and whereby the return motor, when operating, can impart longitudinal motion to said spindle independent of said drive motor.

3. A machine for hobbing gear teeth comprising, in combination, a frame; an elongated work spindle mounted on said frame for rotation about its axis and axial longitudinal sliding movement; means carried by said spindle adjacent one end thereof for securing a work piece thereon; a carriage mounted on said frame adjacent said one end of the spindle and movable with respect thereto; a hobbing device carried on said carriage adapted to operate on the work piece; a driving motor mounted on said frame; a feed shaft journalled in said frame; a first gearing means connecting said driving motor to said hobbing device and transmitting motion thereto; motion transmitting means operatively connecting said motor to said feed shaft; a master wheel axially fixed on said spindle adjacent the other end thereof; second gearing means including an elongated pinion operatively connecting said feed shaft to said master wheel; a feed screw firmly connected to said spindle and forming an axial extension thereof; a nut engaging said feed screw and being operatively associated therewith; and a return motor operatively connected to said nut, whereby, when said drive motor is operating, motion will be simultaneously transmitted to the hob for cutting the work piece and to the master wheel for rotating the spindle, the spindle being fed in axial longitudinal direction by the reaction of its rotation against said nut.

References Cited in the file of this patent

UNITED STATES PATENTS

| | | |
|---|---|---|
| 1,343,435 | Court | June 15, 1920 |
| 1,690,163 | Galloway | Nov. 6, 1928 |
| 2,054,760 | Oberhoffken | Sept. 15, 1936 |
| 2,211,611 | Staples | Aug. 13, 1940 |
| 2,375,172 | Arter | May 1, 1945 |